United States Patent
Van Melle et al.

(10) Patent No.: US 9,177,285 B2
(45) Date of Patent: Nov. 3, 2015

(54) METHOD AND SYSTEM FOR CONTROLLING A SPACE BASED ON MEDIA CONTENT

(75) Inventors: William Van Melle, Los Altos, CA (US); Anthony Dunnigan, Berkeley, CA (US); Eugene Golovchinsky, Menlo Park, CA (US); Scott Carter, Los Altos, CA (US); Pernilla Qvarfordt, Los Altos, CA (US)

(73) Assignee: FUJI XEROX CO., LTD., Tokyo (JP)

( * ) Notice: Subject to any disclaimer, the term of this patent is extended or adjusted under 35 U.S.C. 154(b) by 1398 days.

(21) Appl. No.: 12/116,168

(22) Filed: May 6, 2008

(65) Prior Publication Data

US 2009/0282339 A1    Nov. 12, 2009

(51) Int. Cl.
| | |
|---|---|
| *G06F 17/10* | (2006.01) |
| *G06Q 10/10* | (2012.01) |
| *G06F 3/0484* | (2013.01) |
| *G06F 17/30* | (2006.01) |

(52) U.S. Cl.
CPC ............. *G06Q 10/10* (2013.01); *G06F 3/0484* (2013.01); *G06F 3/04842* (2013.01); *G06F 17/30038* (2013.01); *G06F 17/30056* (2013.01)

(58) Field of Classification Search
CPC .................... G06F 17/30056; G06F 17/30038
USPC ............................ 715/704, 728, 730; 382/170
See application file for complete search history.

(56) References Cited

U.S. PATENT DOCUMENTS

| | | | |
|---|---|---|---|
| 6,404,441 B1* | 6/2002 | Chailleux | 715/704 |
| 6,717,591 B1* | 4/2004 | Fiveash et al. | 715/732 |
| 6,904,566 B2* | 6/2005 | Feller et al. | 715/728 |
| 7,102,643 B2* | 9/2006 | Moore et al. | 345/473 |
| 7,466,858 B2* | 12/2008 | Denoue et al. | 382/170 |
| 8,689,097 B2* | 4/2014 | Varadarajan et al. | 715/230 |
| 2005/0021343 A1* | 1/2005 | Spencer | 704/275 |
| 2006/0070001 A1 | 3/2006 | Liu et al. | |
| 2006/0245616 A1* | 11/2006 | Denoue et al. | 382/100 |
| 2007/0072164 A1* | 3/2007 | Katsuyama et al. | 434/353 |
| 2007/0150583 A1 | 6/2007 | Asthana et al. | |
| 2007/0282948 A1* | 12/2007 | Praino et al. | 709/204 |
| 2008/0183820 A1 | 7/2008 | Golovchinsky et al. | |
| 2009/0113278 A1* | 4/2009 | Denoue et al. | 715/201 |
| 2009/0164512 A1* | 6/2009 | Aizenbud-Reshef et al. | 707/104.1 |
| 2009/0254828 A1* | 10/2009 | Denoue et al. | 715/723 |

FOREIGN PATENT DOCUMENTS

| | | |
|---|---|---|
| JP | 05-265412 | 10/1993 |
| JP | 2000-98986 A | 4/2000 |
| JP | 2005-049424 A | 2/2005 |

OTHER PUBLICATIONS

Adobe, Change slide properties, Nov. 18, 2006, Adobe Connect Enterprise, pp. 1-6.*

(Continued)

*Primary Examiner* — Boris Pesin
*Assistant Examiner* — Justin Lee
(74) *Attorney, Agent, or Firm* — Sughrue Mion, PLLC (57) ABSTRACT

Described is a system and method for controlling the state and capabilities of a meeting room automatically based on the content being presented. The system can detect certain states (such as transitions to a demo, or question-and-answer sessions) based on content of slides, and can automatically switch displays and other devices in a meeting room to accommodate these new states.

29 Claims, 7 Drawing Sheets

(56) References Cited

OTHER PUBLICATIONS

H. Chen, et al., Intelligent agents meet the semantic web in smart spaces, IEEE Internet Computing, 8(6):69-79, 2004.
Thomas Heider, et al., Resource optimization in multi-display environments with distributed grasp, In Proceedings of the First International Conference on Ambient Intelligence Developments (Aml. d'06), pp. 60-76, Sophia Antipolis, France, Sep. 19-22, 2006. Springer.
Japanese Office Action issued on May 7, 2013 for a corresponding Japanese Application No. 2008-315560.
Office Action dated Feb. 4, 2014, issued by the Japanese Patent and Trademark Office in counterpart Japanese Patent Application No. 2008-315560.

\* cited by examiner

METHOD AND SYSTEM FOR CONTROLLING A SPACE BASED ON MEDIA CONTENT

FIELD OF THE INVENTION

This invention generally relates to techniques for automating a presentation environment and more specifically to techniques for controlling the state of the meeting room and/or presentation equipment according to a state of the presentation.

DESCRIPTION OF THE RELATED ART

Presenters in smart meeting rooms often have to manage a range of devices during their presentation. Devices may include multiple displays, PCs, video conferencing devices, and other equipment. A presentation may have multiple stages, and the presenter must manage transitions among those stages by manually controlling equipment in the room. For example, a system described in U.S. patent application Ser. No. 11/855,973 can be used to display documents on multiple screens, but the assignment of content to screens is done strictly by the presenter.

The management of these manual transitions, however, may be time-consuming and complicated and it can take the presenter's attention away from the primary task of presenting, thereby reducing the effectiveness of the presentation.

A system described by Thomas Heider, Martin Giersich, and Thomas Kirste, Resource optimization in multi-display environments with distributed grasp, In Proceedings of the First International Conference on Ambient Intelligence Developments (Aml.d'06), pages 60-76, Sophia Antipolis, France, Sep. 19-22 2006, Springer, automatically determines which document should appear on which display in smart environments. However, this approach relies on a priori rankings by participants of the importance of each document and does not take advantage of any analysis of document content. Systems such as EasyMeeting, described in Chen, H., Finin, T., Joshi, A., Kagal, L., Perich, F., and Chakraborty, D., (2004), Intelligent agents meet the semantic web in smart spaces, *IEEE Internet Computing*, 8(6):69-79, automate meeting events based on context sensing, but do not use presentation content to determine system behavior.

Some systems such as those described in Published United States Patent Application No. 20070150583 and Published United States Patent Application No. 20060070001 allow users to script multiscreen presentations, but that requires up-front manual authoring effort to allocate slides to displays or to determine triggering events.

Therefore, unfortunately, conventional presentation systems and methods do not provide for automated detection of transitions in presentations and do not allow automatic control of the equipment in the presentation environment based on the detected transitions which are identified from the content of the presentation. Thus, new techniques for automating some of the transitions tasks (such as switching to a demo) based on the contents of some media stream (such as a set of PowerPoint slides being presented) are needed.

SUMMARY OF THE INVENTION

The inventive methodology is directed to methods and systems that substantially obviate one or more of the above and other problems associated with conventional techniques for controlling presentation environment.

In accordance with one aspect of the inventive concept there is provided a computerized presentation system. The inventive presentation system incorporates a presentation module operable to generate at least a portion of a representation of a presentation capable of being presented to an audience; multiple presentation devices operable to present the representation of the presentation to the audience; a presentation state detection module operable to receive and analyze a content of the presentation, to detect an aspect of the content and to associate the detected aspect with a change in a presentation state; and a presentation control module operatively coupled with the plurality of presentation devices and the presentation state detection module and operable to cause one or more of the plurality of presentation devices to be reconfigured in accordance with a command received from the presentation state detection module.

In accordance with another aspect of the inventive concept there is provided a computerized presentation system. The inventive presentation system incorporates a presentation module operable to generate a representation of a presentation capable of being provided to an audience; multiple presentation devices operable to present the representation of the presentation to the audience; and a presentation state detection module operable to receive and analyze a content of the presentation, to detect an aspect of the content, to associate the detected aspect with a change in a presentation state and to send a command to the presentation module, the command instructing the presentation module to manipulate the presentation or a display of the presentation based on the change in a presentation state.

In accordance with another aspect of the inventive concept there is provided a presentation method. The inventive method involves: generating a representation of a presentation capable of being presented to an audience; presenting the representation of the presentation to the audience using multiple presentation devices; analyzing a content of the presentation; detecting an aspect of the content; associating the detected aspect with a change in a state of the presentation; and reconfiguring one or more of the multiple presentation devices in accordance with the change in the state of the presentation.

In accordance with another aspect of the inventive concept there is provided a computer-readable medium embodying a set of instructions, which, when executed by one or more processors cause the one or more processors to: generate a representation of a presentation capable of being presented to an audience; present the representation of the presentation to the audience using multiple presentation devices; analyze the content of the presentation; detect an aspect of the content; associate the detected aspect with a change in the presentation state; and reconfigure one or more of the multiple presentation devices in accordance with the change in the presentation state.

Additional aspects related to the invention will be set forth in part in the description which follows, and in part will be obvious from the description, or may be learned by practice of the invention. Aspects of the invention may be realized and attained by means of the elements and combinations of various elements and aspects particularly pointed out in the following detailed description and the appended claims.

It is to be understood that both the foregoing and the following descriptions are exemplary and explanatory only and are not intended to limit the claimed invention or application thereof in any manner whatsoever.

BRIEF DESCRIPTION OF THE DRAWINGS

The accompanying drawings, which are incorporated in and constitute a part of this specification exemplify the embodiments of the present invention and, together with the description, serve to explain and illustrate principles of the inventive technique. Specifically.

DETAILED DESCRIPTION

In the following detailed description, reference will be made to the accompanying drawings, in which identical functional elements are designated with like numerals. The aforementioned accompanying drawings show by way of illustration, and not by way of limitation, specific embodiments and implementations consistent with principles of the present invention. These implementations are described in sufficient detail to enable those skilled in the art to practice the invention and it is to be understood that other implementations may be utilized and that structural changes and/or substitutions of various elements may be made without departing from the scope and spirit of the present invention. The following detailed description is, therefore, not to be construed in a limited sense. Additionally, the various embodiments of the invention as described may be implemented in the form of a software running on a general purpose computer, in the form of a specialized hardware, or combination of software and hardware.

When a system according to an embodiment of the system detects a transition point, it can either automatically switch states, or can prompt the presenter in an unobtrusive way to perform several complex tasks with a single interaction.

In accordance with an embodiment of the inventive technique, several transitions can be automated during a presentation. These include switching from a presentation to a demo, switching to question-and-answer mode, switching between presenters, and ending a presentation. Other transitions are also possible.

Switching to a Demo

In accordance with one embodiment of the invention, the presentation environment incorporates a multi-display conference room. In this environment, presenters may use different displays for different purposes during a presentation. One common practice among presenters is to start a presentation with a set of slides (using PowerPoint or some other presentation tool), and then to switch to a demo. Often, the transition to the demo is preceded with a slide that says "Demo" or "Demonstration" (or an equivalent in another language), as illustrated, for example, in FIG. 1.

Typically, at the point of transition to the demo mode, the presenter will manually switch the display to the demo (either by manually activating a new application that will be displayed on the screen, or by switching the display to a different computer), and proceed with the demo. This transition can be time-consuming, visually disruptive, and the audience may lose a sense of continuity between the slide presentation and the demo.

In accordance with one embodiment of the invention, the detected presence of the word "Demo" on a slide (e.g., as the only word on the slide, or the only word in the title, or one word on a slide with only a few words on it) is used to initiate automatically (or semi-automatically) the appropriate transition. In various embodiments of the invention, the transition may involve switching the presentation to a side display, and starting or showing the demo program on the main screen. In semi-automatic mode, an embodiment of the inventive system informs the presenter through the presenter's interface that such an action is now possible, and allows the presenter to accomplish the transition in a single touch or click. This allows the presenter to focus on the presentation rather than on the mechanics of manipulating the displays. As would be appreciated by persons of skill in the art, the transition may involve several complex actions.

Figure 1:
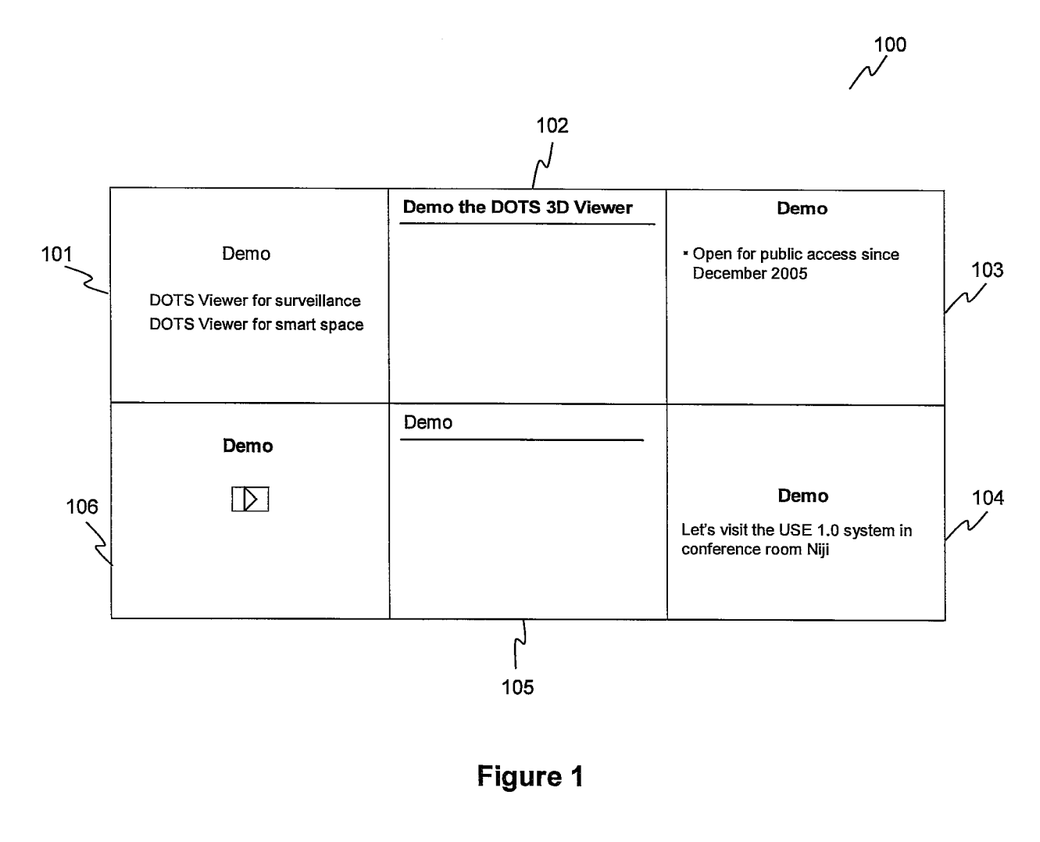
FIG. 1 illustrates sample demo cueing slides drawn from actual presentations.

FIG. 1 illustrates sample demo cueing slides drawn from actual presentations. In this figure, slides 101-106 have been taken from actual presentations. All those slides indicate the transition into the demo mode. This transition may be detected by the inventive system using the word demo appearing within the presentation slides, as shown by elements 101-106.

Figure 2:
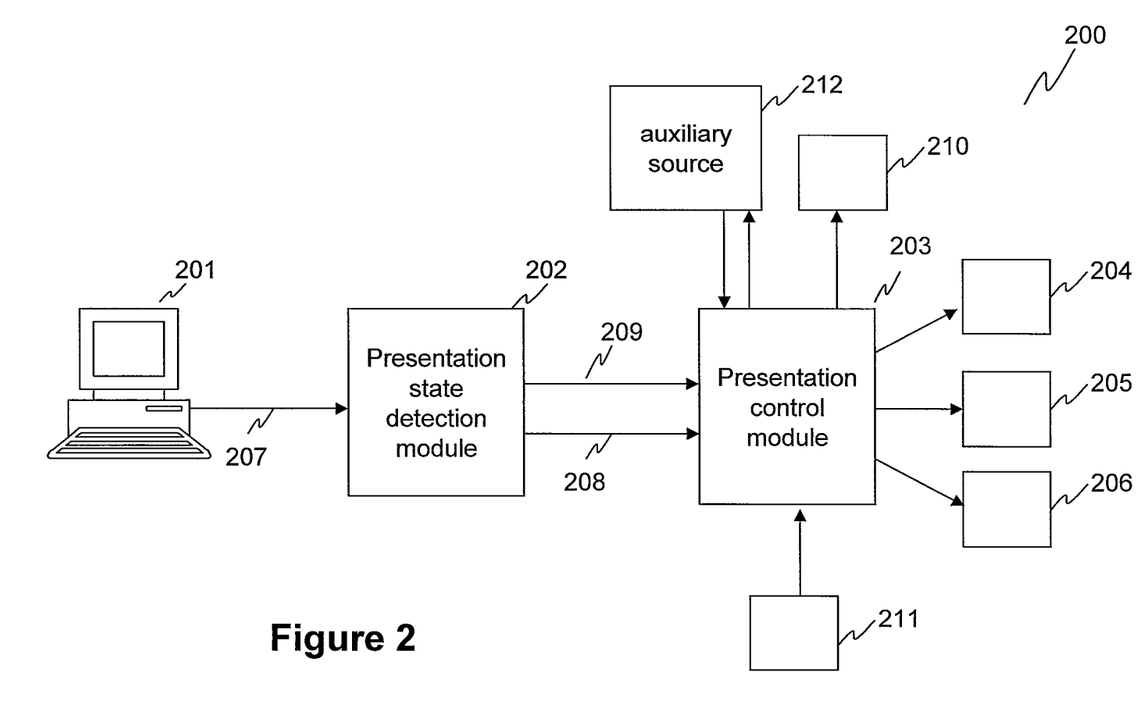
FIG. 2 illustrates an exemplary system configuration of an embodiment of the inventive system.

FIG. 2 illustrates an exemplary system configuration of an embodiment of the inventive system 200. The shown embodiment of the inventive system incorporates a presenter's computer system 201, a presentation state detection module 202 and a presentation control module 203, which controls a plurality of presentation devices 204-206. During the operation, a presentation slide representation 207 is generated by a presentation generation application, such as Microsoft Power Point, executed by the user's computer system 201. The presentation slide is transmitted by the application to the presentation state detection module 202, which may reside on the same computer system 201 or on a different computer system (not shown). The presentation state detection module analyzes the presentation slide 207 and determines whether a change in the presentation state has occurred based on the analyzed slide 207. For example, as shown in FIG. 1, the slide may have the word "demo" or "demonstration," which would indicate to the presentation state detection module 202 that the presentation state has changed to the demo mode. Besides the words "demo" or "demonstration", the presentation state detection module 202 may also take into account the context in which the respective word appears in the presentation. The context may be determined from the content of the entire slide containing the respective word, such as the position of the word in the slide, the other content appearing on the slide, and the like.

In addition, the system 200 may further include one or more of auxiliary sources 212, which may generate video, audio, or any other portions of the presentation. These sources may be controlled by control signals received from the presentation control module 203. In addition, the system may include a presenter's display 210, which is viewable only by the presenter and is used by the presenter to control the presentation. Finally, the system 200 may also include a presenter's control 211.

If no change in presentation state is detected, the presentation slide 207 is passed to the presentation control module 203 and is simply displayed on one or more of the presentation devices 204-206.

If the change in the presentation state is detected by the presentation state detection module based on the content of the presentation slide 207, then the presentation state detection module 202 sends a command 209 to the presentation control module 203. The command 209 instructs the presentation control module 203 to change the presentation device configuration for displaying the presentation. For example the presentation device configuration change may include switching the presentation to a side display and configuring the main display to display the demonstration. In response to the command 209, the presentation control module may first display the presentation slide 209 and, after a predetermined delay, which may be specified in the command 209, may make the aforesaid changes to the presentation device configuration. In another embodiment, the re-configuration of the presentation device 204-206 is performed by the presentation control module without a delay.

In another embodiment of the invention, upon detection of the change in the presentation state, the presentation state detection module would cause a dialog or a button to appear on the human interface used by the presenter (such as the presenter display 210) and invite the presenter to initiate the configuration change by taking a simple action involving the aforesaid human interface, such as touching the screen or pressing a button. Upon the receipt of such user action, the presentation state detection module sends the command 209 to the presentation control module causing it to reconfigure the presentation devices 204-206.

Figure 3:
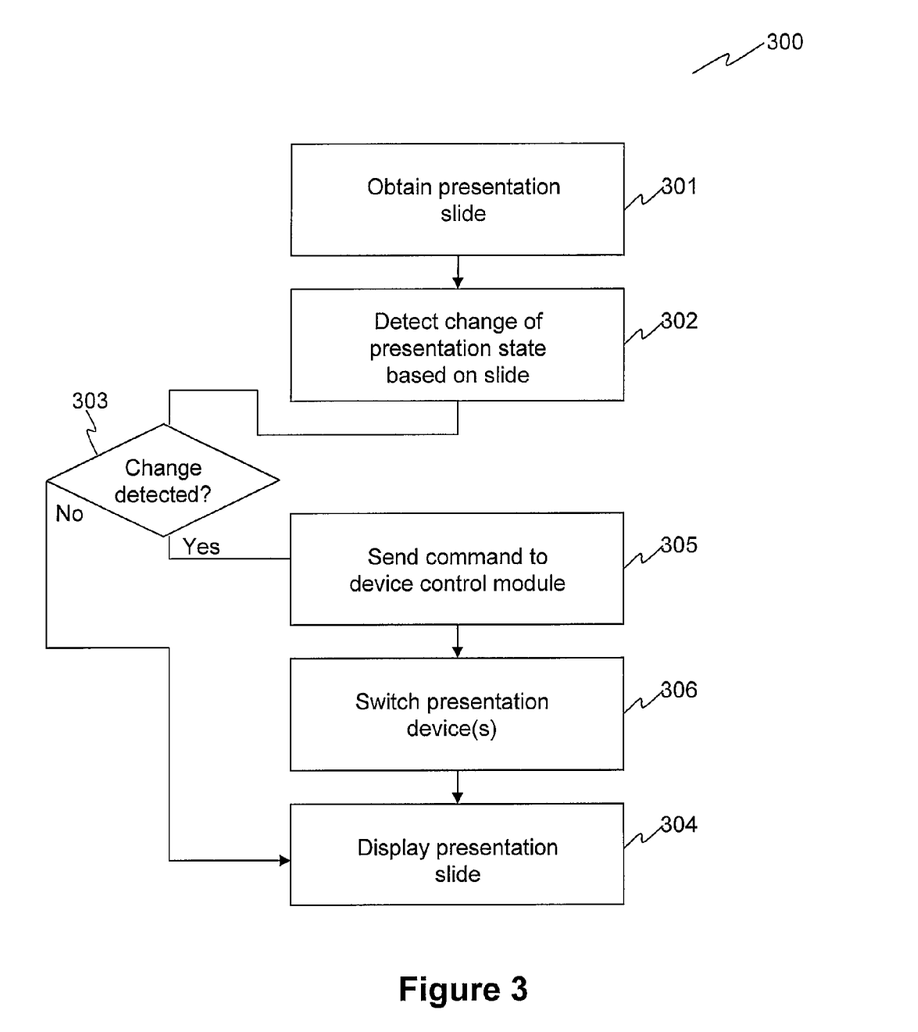
FIG. 3 illustrates an exemplary operational sequence of an embodiment of the inventive system.

FIG. 3 illustrates an exemplary operational sequence of an embodiment of the inventive system. At step 301, the presentation state detection module obtains a presentation slide, for example, from a Microsoft Power Point application. At step 302, the embodiment of the inventive system detects a change of presentation state based on the content of the slide. If no change is detected (step 303), then the presentation slide is displayed at step 304. Otherwise, the presentation state detection module sends a command to the presentation control module 203 to change the configuration of the presentation devices 204-206. At step 306, pursuant to the received command, the presentation control module changes the configuration of the presentation devices 204-206. After that, at step 304, the presentation slide is displayed using the presentation devices 204-206.

Figure 4:
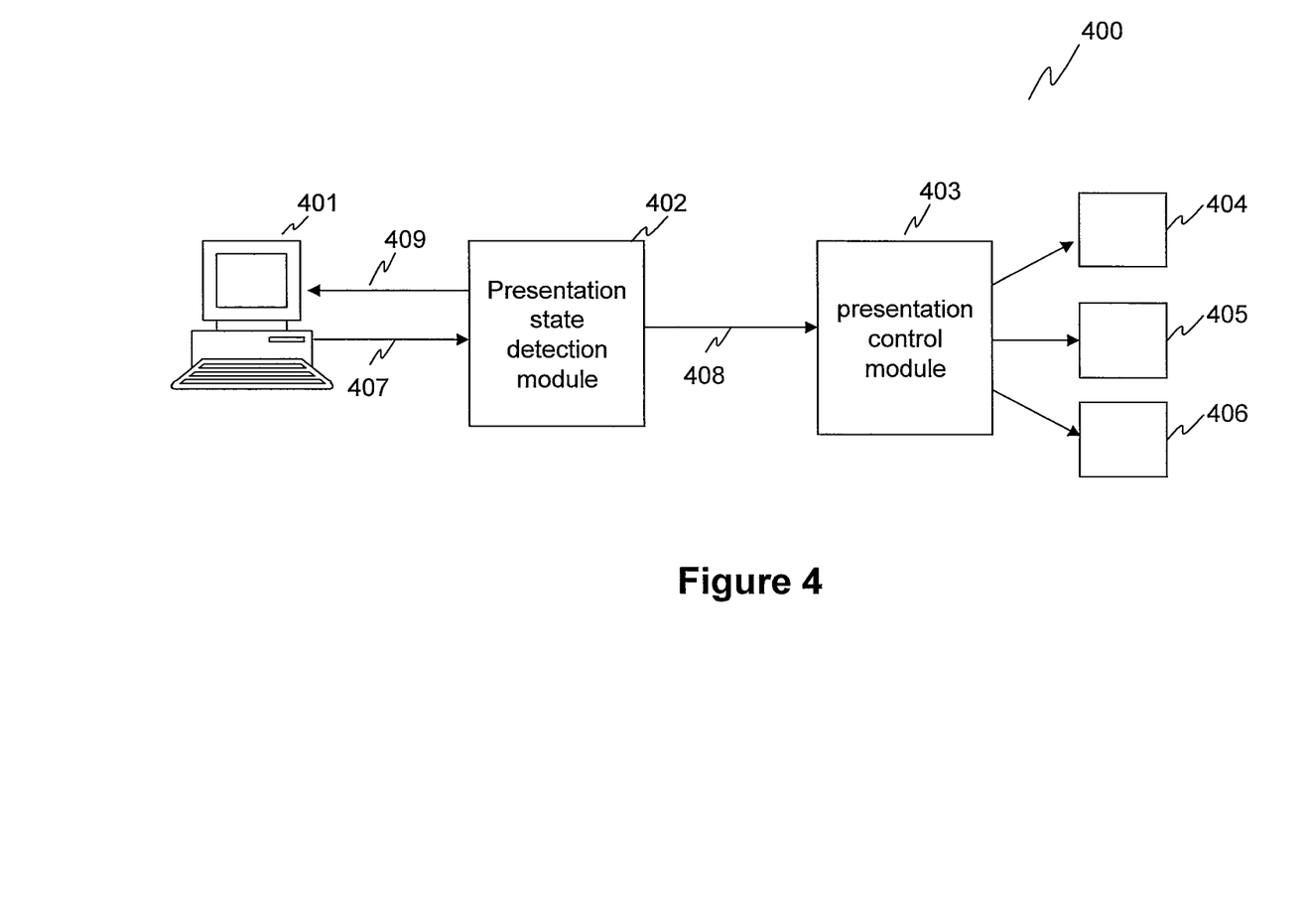
FIG. 4 illustrates another exemplary system configuration of an embodiment of the inventive system.

FIG. 4 illustrates another exemplary system configuration of an embodiment of the inventive system. The shown embodiment of the inventive system incorporates a presenter's computer system 401, a presentation state detection module 402 and a presentation control module 403, which controls a plurality of presentation devices 404-406. During the operation, a presentation slide representation 407 is generated by a presentation generation application, such as Microsoft Power Point, executed by the user's computer system 401. The presentation slide is transmitted by the application to the presentation state detection module 402, which may reside on the same computer system 201 or on a different computer system (not shown). The presentation state detection module analyzes the presentation slide 407 and determines whether the change of presentation state has occurred based on the analyzed slide 207. If no change in presentation state is detected, the presentation slide 407 is passed to the presentation control module 403 and is simply displayed on the presentation devices 404-406.

If the change in the presentation state is detected by the presentation state detection module based on the content of the presentation slide 407, then the presentation detection module 402 sends a command 409 to the presentation application executing on the computer system 401, or any other application on this or other computer system. In addition, the command 409 may instruct the computer system 401 or any other computer system to execute another application (not shown), such as a demonstration application or a video display application. Optionally, the command 409 may instruct the presentation application to rearrange the slides on the presenter's own display (display of the computer system 401), see the description of the questions and answers mode below, or perform any other manipulations with the slides.

Yet another embodiment of the invention combines both systems shown in FIG. 2 and in FIG. 4 in that the presentation state detection module sends both command 209 to reconfigure the presentation devices and the command 409 to start the demonstration application on the computer system 401, which may be the same or different from the computer system 201.

Figure 5:
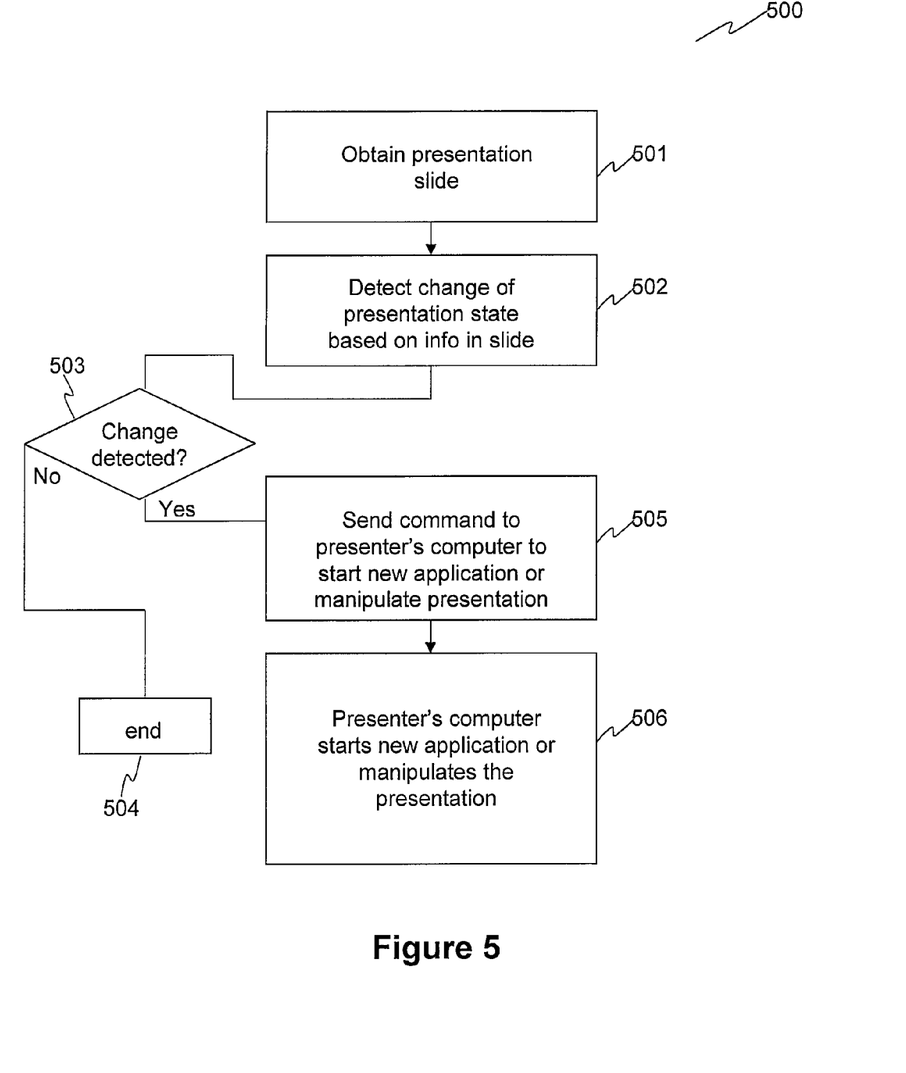
FIG. 5 illustrates another exemplary operational sequence of an embodiment of the inventive system.

The operation of the exemplary embodiment shown in FIG. 4 is illustrated in FIG. 5. The presentation slide is obtained at step 501, for example, from a Microsoft Power Point application. At step 502, the embodiment of the inventive system detects a change of presentation state based on the content of the slide. If no change is detected (step 503), then the operation terminates at step 504. Otherwise, the presentation state detection module sends a command to the presenter's computer system 401 to initiate a new application or manipulate the presentation. At step 506, pursuant to the received command, the presenter's computer system 506 starts a new application or manipulates the presentation (for example, re-arranges presentation slides on the presenter's display).

As would be appreciated by persons of ordinary skill in the art, the present invention is not limited to any specific type of presentation devices 404-406. Such devices may be display screens, sound devices, printers, lights and the like. Also, the inventive methodology is not limited to any type of the application or applications initiated by the command 409. Such applications may be a web browser, video player, demo program or any other suitable application what so ever.

Switching to Question-and-Answer Mode

Question and answer sessions that follow presentations often involve random access to slides already presented. When audience members have questions about information presented on a particular slide, they often request that the slides in question be re-displayed to provide appropriate context for the question. This may involve awkward iterative communication between the audience and the presenter, and awkward navigation by the presenter through a potentially large presentation to answer the question.

In accordance with another embodiment of the inventive concept, the navigation through a large slide set at the end of the presentation is improved by showing multiple slides on a presenter's display 210 (visible only to the presenter) and allowing the presenter to select slides from this display at random using, for example, the presenter's control 211. The selected slides are then shown on the main display, creating a seamless viewing experience for the audience.

Figure 6:
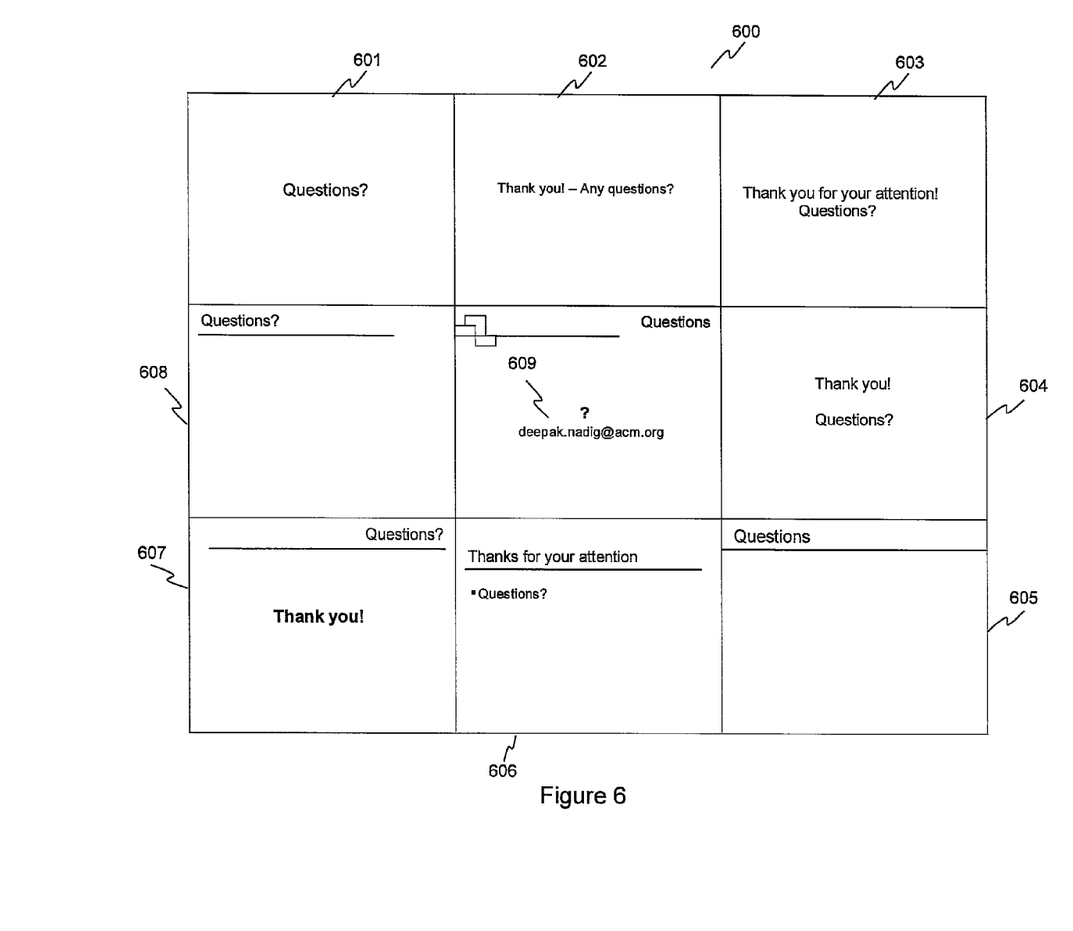
FIG. 6 illustrates some sample slides cueing a Q&A session drawn from actual presentations.

FIG. 6 illustrates some sample slides cueing a Q&A session drawn from actual presentations. Specifically, in FIG. 6, slides 601-609 contain word "questions" which used by the embodiment of the inventive system to detect the transition of the presentation state to questions and answers. Thus, an embodiment of the inventive concept performs automated (or semi-automated) transition based on the presence of a slide labeled "Questions" (with an optional "Thank you") or the like words or sentences (see FIG. 6). The presence of the aforesaid words or sentences places the presenter's interface into the multi-slide view (as opposed to the sequential navigation view) to facilitate random backtracking of the presentation slides by the presenter.

This embodiment of the invention is illustrated in FIGS. 4 and 5. In case of the question and answer sessions, the command 409 sent by the presentation state detection module 4-2 instructs the presentation application executing on the computer system 401 to switch the presenter's interface (either display of the computer system 401 or a dedicated display) into the multi-slide view. A slide selection functionality may also be enabled by this command to facilitate the selection of a specific slide for display by the presenter.

Switching between Presenters

In situations when more than one person presents during a meeting, they may take turns presenting information. In some cases, it may be desirable to indicate these transitions to the audience with a slide that shows the next presenter's name. One embodiment of the inventive system can recognize the name, and switch to that presenter's configuration (slides, demo, etc.) automatically (perhaps after a short delay to allow the audience to see and understand that a transition to another speaker is taking place) while the speakers physically switch places. By the time the new speaker reaches the front of the room, the system has transformed itself (and the displays) to show that speaker's materials. The second speaker can end his presentation with a similar transition.

The presenter's configuration may include the presentation slide set, the demos, the colors, the lighting and the like characteristics, which are of course not limiting the scope of the invention.

Video

Some presentations include a video that is shown through some other mechanism (such as from a DVD or a video server). The proposed system can trigger the playing of video based on the detection of a slide that is labeled "Video."

End of Presentation

The end of a presentation may be indicated by the word "End" displayed prominently on the slide. In that case, an embodiment of the inventive system automatically (or semi-automatically) transitions to some default state, such as blanking the side screens, or putting up an agenda on a side screen. In the semi-automatic case, the embodiment of the inventive system prompts the user to initiate the transition.

Detecting Transition Cueing Slides

Potential transition matches may be detected in a number of ways. The simplest is simple string matching for text on a slide; more information may be used by matching to specific fields (e.g., title) on slides. Even more sophisticated mechanisms to detect transition slides, such as demo or question slides, can be built by training a classifier based on some examples. A source of manually-classified slides such as that found in ProjectorBox (or gathered from a large number of presentations) can be used to train a classifier to automatically detect transition slides. Features used for classification can include some key terms (such as "demo" or "questions"), the number of words and bullet items on the page (possibly quantized into a few levels), the number of objects on a slide, and visual measures of uniformity. The exact set of measures should be determined empirically.

Exemplary Computer Platform

Figure 7:
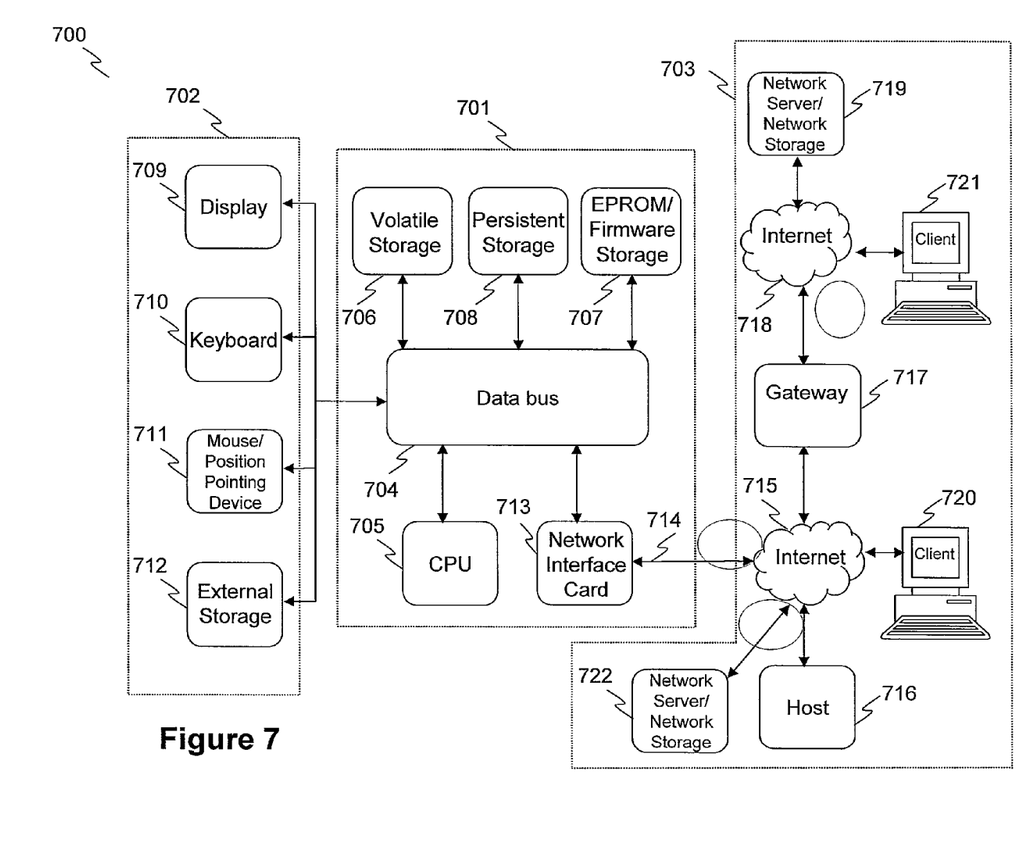
FIG. 7 illustrates an exemplary embodiment of a computer platform upon which the inventive system may be implemented.

FIG. 7 is a block diagram that illustrates an embodiment of a computer/server system 700 upon which an embodiment of the inventive methodology may be implemented. The system 700 includes a computer/server platform 701, peripheral devices 702 and network resources 703.

The computer platform 701 may include a data bus 704 or other communication mechanism for communicating information across and among various parts of the computer platform 701, and a processor 705 coupled with bus 701 for processing information and performing other computational and control tasks. Computer platform 701 also includes a volatile storage 706, such as a random access memory (RAM) or other dynamic storage device, coupled to bus 704 for storing various information as well as instructions to be executed by processor 705. The volatile storage 706 also may be used for storing temporary variables or other intermediate information during execution of instructions by processor 705. Computer platform 701 may further include a read only memory (ROM or EPROM) 707 or other static storage device coupled to bus 704 for storing static information and instructions for processor 705, such as basic input-output system (BIOS), as well as various system configuration parameters. A persistent storage device 708, such as a magnetic disk, optical disk, or solid-state flash memory device is provided and coupled to bus 701 for storing information and instructions.

Computer platform 701 may be coupled via bus 704 to a display 709, such as a cathode ray tube (CRT), plasma display, or a liquid crystal display (LCD), for displaying information to a system administrator or user of the computer platform 701. An input device 710, including alphanumeric and other keys, is coupled to bus 701 for communicating information and command selections to processor 705. Another type of user input device is cursor control device 711, such as a mouse, a trackball, or cursor direction keys for communicating direction information and command selections to processor 704 and for controlling cursor movement on display 709. This input device typically has two degrees of freedom in two axes, a first axis (e.g., x) and a second axis (e.g., y), that allows the device to specify positions in a plane.

An external storage device 712 may be connected to the computer platform 701 via bus 704 to provide an extra or removable storage capacity for the computer platform 701. In an embodiment of the computer system 700, the external removable storage device 712 may be used to facilitate exchange of data with other computer systems.

The invention is related to the use of computer system 700 for implementing the techniques described herein. In an embodiment, the inventive system may reside on a machine such as computer platform 701. According to one embodiment of the invention, the techniques described herein are performed by computer system 700 in response to processor 705 executing one or more sequences of one or more instructions contained in the volatile memory 706. Such instructions may be read into volatile memory 706 from another computer-readable medium, such as persistent storage device 708. Execution of the sequences of instructions contained in the volatile memory 706 causes processor 705 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 705 for execution. The computer-readable medium is just one example of a machine-readable medium, which may carry instructions for implementing any of the methods and/or techniques described herein. Such a medium may take many forms, including but not limited to, non-volatile media, volatile media, and transmission media. Non-volatile media includes, for example, optical or magnetic disks, such as storage device 708. Volatile media includes dynamic memory, such as volatile storage 706. Transmission media includes coaxial cables, copper wire and fiber optics, including the wires that comprise data bus 704. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, an EPROM, a FLASH-EPROM, a flash drive, a memory card, any other memory chip or cartridge, a carrier wave as described hereinafter, or any other medium from which a computer can read.

Various forms of computer readable media may be involved in carrying one or more sequences of one or more instructions to processor 705 for execution. For example, the instructions may initially be carried on a magnetic disk from a remote computer. Alternatively, a remote computer can load the instructions into its dynamic memory and send the instructions over a telephone line using a modem. A modem local to computer system 700 can receive the data on the telephone line and use an infra-red transmitter to convert the data to an infra-red signal. An infra-red detector can receive the data carried in the infra-red signal and appropriate circuitry can place the data on the data bus 704. The bus 704 carries the data to the volatile storage 706, from which processor 705 retrieves and executes the instructions. The instructions received by the volatile memory 706 may optionally be stored on persistent storage device 708 either before or after execution by processor 705. The instructions may also be downloaded into the computer platform 701 via Internet using a variety of network data communication protocols well known in the art.

The computer platform 701 also includes a communication interface, such as network interface card 713 coupled to the data bus 704. Communication interface 713 provides a two-way data communication coupling to a network link 714 that is connected to a local network 715. For example, communication interface 713 may be an integrated services digital network (ISDN) card or a modem to provide a data communication connection to a corresponding type of telephone line. As another example, communication interface 713 may be a local area network interface card (LAN NIC) to provide a data communication connection to a compatible LAN. Wireless links, such as well-known 802.11a, 802.11b, 802.11g and Bluetooth may also used for network implementation. In any such implementation, communication interface 713 sends and receives electrical, electromagnetic or optical signals that carry digital data streams representing various types of information.

Network link 713 typically provides data communication through one or more networks to other network resources. For example, network link 714 may provide a connection through local network 715 to a host computer 716, or a network storage/server 717. Additionally or alternatively, the network link 713 may connect through gateway/firewall 717 to the wide-area or global network 718, such as an Internet. Thus, the computer platform 701 can access network resources located anywhere on the Internet 718, such as a remote network storage/server 719. On the other hand, the computer platform 701 may also be accessed by clients located anywhere on the local area network 715 and/or the Internet 718. The network clients 720 and 721 may themselves be implemented based on the computer platform similar to the platform 701.

Local network 715 and the Internet 718 both use electrical, electromagnetic or optical signals that carry digital data streams. The signals through the various networks and the signals on network link 714 and through communication interface 713, which carry the digital data to and from computer platform 701, are exemplary forms of carrier waves transporting the information.

Computer platform 701 can send messages and receive data, including program code, through the variety of network(s) including Internet 718 and LAN 715, network link 714 and communication interface 713. In the Internet example, when the system 701 acts as a network server, it might transmit a requested code or data for an application program running on client(s) 720 and/or 721 through Internet 718, gateway/firewall 717, local area network 715 and communication interface 713. Similarly, it may receive code from other network resources.

The received code may be executed by processor 705 as it is received, and/or stored in persistent or volatile storage devices 708 and 706, respectively, or other non-volatile storage for later execution. In this manner, computer system 701 may obtain application code in the form of a carrier wave.

It should be noted that the present invention is not limited to any specific firewall system. The inventive policy-based content processing system may be used in any of the three firewall operating modes and specifically NAT, routed and transparent.

Finally, it should be understood that processes and techniques described herein are not inherently related to any particular apparatus and may be implemented by any suitable combination of components. Further, various types of general purpose devices may be used in accordance with the teachings described herein. It may also prove advantageous to construct specialized apparatus to perform the method steps described herein. The present invention has been described in relation to particular examples, which are intended in all respects to be illustrative rather than restrictive. Those skilled in the art will appreciate that many different combinations of hardware, software, and firmware will be suitable for practicing the present invention. For example, the described software may be implemented in a wide variety of programming or scripting languages, such as Assembler, C/C++, Perl, shell, PHP, Java, etc.

Moreover, other implementations of the invention will be apparent to those skilled in the art from consideration of the specification and practice of the invention disclosed herein. Various aspects and/or components of the described embodiments may be used singly or in any combination in the computerized system with presentation environment controlling functionality. It is intended that the specification and examples be considered as exemplary only, with a true scope and spirit of the invention being indicated by the following claims.

What is claimed is:

1. A system comprising:
   a processor;
   a presentation module operable to generate at least a portion of a representation of a presentation capable of being presented to an audience;
   a plurality of presentation devices operable to present the representation of the presentation to the audience;
   a presentation state detection module operable to receive and analyze a content of the presentation, wherein the content of the presentation comprises at least one slide, to detect at least one keyword contained in the at least one slide of the presentation and to associate the detected at least one keyword with a change in a presentation state; and
   a presentation control module operatively coupled with the plurality of presentation devices and the presentation state detection module and operable to cause one or more of the plurality of presentation devices to be reconfigured in accordance with a command received from the presentation state detection module,
wherein the at least one keyword that is detectable in the at least one slide of the presentation to reconfigure the one or more of the plurality of presentation devices comprises at least one of demo, question, video, a name of a new presenter, and end,
wherein the at least one keyword comprises the name of the new presenter,
wherein the presentation state detection module is operable to instruct the presentation control module to reconfigure the one or more of the plurality of presentation devices based on the at least one keyword contained in the at least one slide, and
wherein the presentation state detection module is operable to detect the name of the new presenter within the presentation and, in response to the presentation state detection module detecting the name of the new presenter within the presentation, instruct the presentation module to load presentation settings of the new presenter.

2. The system of claim 1, further comprising a presenter display operable to display to a presenter information related to the presentation and a presenter control operable to enable the presenter to confirm the reconfiguration of the plurality of presentation devices based on the change in a presentation state.

3. The system of claim 1, further comprising at least one secondary presentation module operable to generate at least a second portion of the representation, the secondary presentation module is operable to be controlled by the presentation control module.

4. The system of claim 1, wherein the presentation control module is operable to cause one or more of the plurality of presentation devices to be reconfigured in response to a received command.

5. The system of claim 4, wherein the reconfiguring comprises moving at least a portion of the representation of the presentation to a different presentation device of the plurality of presentation devices.

6. The system of claim 1, wherein in response to the presentation state detection module detecting the change in the presentation state by detecting the keyword demo within the presentation, the presentation state detection module is operable to instruct the presentation control module to reconfigure the one or more of the plurality of presentation devices for displaying a demonstration.

7. The system of claim 1, wherein in response to the presentation state detection module detecting the change in the presentation state by detecting the keyword video within the presentation, the presentation state detection module is operable to instruct the presentation control module to reconfigure the one or more of the plurality of presentation devices for displaying a video media.

8. The system of claim 1, wherein in response to the presentation state detection module detecting the change in the presentation state by detecting the keyword end within the presentation, the presentation state detection module is operable to instruct the presentation control module to reconfigure the one or more of the plurality of presentation devices to enter a default state.

9. The system of claim 1, wherein the presentation state detection module is operable to detect the at least one keyword contained in the at least one slide of the presentation by text string matching.

10. The system of claim 1, wherein the presentation state detection module is further operable to detect the at least one keyword contained in the at least one slide of the presentation using a context in which a text string appears within the presentation.

11. The system of claim 1, wherein the presentation state detection module is operable to detect the at least one keyword contained in the at least one slide of the presentation by text string matching in a predetermined presentation field.

12. The system of claim 1, wherein the presentation state detection module is operable to detect the at least one keyword contained in the at least one slide of the presentation by identifying transitional slides using a slide classifier based on at least one feature of a slide of the presentation.

13. The system of claim 1, wherein the presentation state detection module is operable to request a confirmation from a presenter of the presentation prior to sending the command to the presentation control module.

14. A system comprising:
a processor;
a presentation module operable to generate a representation of a presentation capable of being provided to an audience;
a plurality of presentation devices operable to present the representation of the presentation to the audience; and
a presentation state detection module operable to receive and analyze a content of the presentation, wherein the content of the presentation comprises at least one slide, to detect at least one keyword contained in the at least one slide of the presentation, to associate the detected at least one keyword with a change in a presentation state and to send a command to the presentation module, the command instructing the presentation module to manipulate the presentation or a display of the presentation based on the change in a presentation state,
wherein the at least one keyword that is detectable in the at least one slide of the presentation to reconfigure the one or more of the plurality of presentation devices comprises at least one of demo, question, video, a name of a new presenter, and end,
wherein the at least one keyword comprises the name of the new presenter,
wherein the presentation state detection module is operable to reconfigure the one or more of the plurality of presentation devices based on the at least one keyword contained in the at least one slide, and
wherein the presentation state detection module is operable to detect the name of the new presenter within the presentation and, in response to the presentation state detection module detecting the name of the new presenter within the presentation, instruct the presentation module to load presentation settings of the new presenter.

15. The system of claim 14, further comprising a presenter display operable to display to a presenter information related to the presentation and a presenter control operable to enable the presenter to confirm the reconfiguration of the plurality of presentation devices based on the change in a presentation state.

16. The system of claim 14, further comprising a presenter display operable to display to a presenter information related to the presentation, wherein manipulating the display of the presentation comprises displaying multiple slides of the presentation to the presenter on the presenter display.

17. The system of claim 14, wherein manipulating the presentation comprises activating a slide selection functionality on a presenter's user interface.

18. The system of claim 14, wherein in response to the presentation state detection module detecting the at least one keyword contained in the at least one slide of the presentation by detecting the keyword demo within the presentation, the presentation state detection module is operable to instruct the presentation module to initiate execution of a demo application.

19. The system of claim 14, wherein in response to the presentation state detection module detecting the at least one keyword contained in the at least one slide of the presentation by detecting the keyword video within the presentation, and the presentation state detection module is operable to instruct the presentation module to initiate execution of a video application.

20. The system of claim 14, wherein in response to the presentation state detection module detecting the at least one keyword contained in the at least one slide of the presentation by detecting the keyword end within the presentation, the presentation state detection module is operable to instruct the presentation module to cause an agenda to be displayed on the one or more presentation devices.

21. The system of claim 14, wherein the presentation state detection module is operable to detect the at least one keyword contained in the at least one slide of the presentation by text string matching.

22. The system of claim 14, wherein the presentation state detection module is operable to detect the at least one keyword contained in the at least one slide of the presentation by text string matching in a predetermined presentation field.

23. The system of claim 14, wherein the presentation state detection module is operable to detect the at least one keyword contained in the at least one slide of the presentation by identifying transitional slides using a slide classifier based on at least one feature of a slide of the presentation.

24. The system of claim 14, wherein the presentation state detection module is operable to request a confirmation from a presenter of the presentation prior to sending the command to the presentation module.

25. The system of claim 14, wherein the presentation state detection module is operable to send the command to the presentation module automatically upon the detection of the at least one keyword contained in the at least one slide of the presentation.

26. A method comprising:
utilizing a processor for generating a representation of a presentation capable of being presented to an audience;
presenting the representation of the presentation to the audience using a plurality of presentation devices;
analyzing a content of the presentation, wherein the content of the presentation comprises at least one slide;
detecting at least one keyword contained in the at least one slide of the presentation;
associating the detected at least one keyword with a change in a state of the presentation; and
reconfiguring one or more of the plurality of presentation devices in accordance with the change in the state of the presentation,
wherein the at least one keyword that is detectable in the at least one slide of the presentation to reconfigure the one or more of the plurality of presentation devices comprises at least one of demo, question, video, a name of a new presenter, and end,
wherein the at least one keyword comprises the name of the new presenter,
wherein the reconfiguring the one or more of the plurality of presentation devices further comprises reconfiguring the one or more of the plurality of presentation devices based on the at least one keyword contained in the at least one slide, and
wherein the method further comprises detecting the name of the new presenter within the presentation and, in response to the detecting the name of the new presenter within the presentation, instructing loading of presentation settings of the new presenter.

27. A non-transitory computer-readable medium embodying a set of instructions, which, when executed by one or more processors cause the one or more processors to execute a method comprising:
generating a representation of a presentation capable of being presented to an audience;
presenting the representation of the presentation to the audience using a plurality of presentation devices;
analyzing a content of the presentation, wherein the content of the presentation comprises at least one slide;
detecting at least one keyword contained in the at least one slide of the presentation;
associating the detected at least one keyword with a change in a state of the presentation; and
reconfiguring one or more of the plurality of presentation devices in accordance with the change in the presentation state,
wherein the at least one keyword that is detectable in the at least one slide of the presentation to reconfigure the one or more of the plurality of presentation devices comprises at least one of demo, question, video, a name of a new presenter, and end,
wherein the at least one keyword comprises the name of the new presenter,
wherein the reconfiguring the one or more of the plurality of presentation devices further comprises reconfiguring the one or more of the plurality of presentation devices based on the at least one keyword contained in the at least one slide, and
wherein the method further comprises detecting the name of the new presenter within the presentation and, in response to the detecting the name of the new presenter within the presentation, instructing loading of presentation settings of the new presenter.

28. The system of claim 1, wherein the presentation state detection module is operable to detect the at least one keyword in the at least one slide of the presentation by identifying ones of the at least one slide that are transitional slides and identifying a type of the transitional slides for the ones of the at least one slide, based on a result of the analyzing the content of the at least one slide.

29. The system of claim 28, wherein the presentation control module causes one or more of the plurality of presentation devices to be reconfigured based on the identified type of the transitional slides for the ones of the at least one slide, to transition into at least one of a demonstration, a question and answer session, a switching of a presenter, an end for the presentation, and a launching of a video.

* * * * *